United States Patent [19]

Eustace et al.

[11] 4,068,046
[45] Jan. 10, 1978

[54] METAL HALOGEN ELECTROCHEMICAL CELL

[75] Inventors: Daniel J. Eustace, Chatham; Paul A. Malachesky, Berkeley Heights, both of N.J.

[73] Assignee: Exxon Research and Engineering Company, Linden, N.J.

[21] Appl. No.: 792,247

[22] Filed: Apr. 29, 1977

Related U.S. Application Data

[63] Continuation-in-part of Ser. No. 674,585, April 7, 1976, abandoned.

[51] Int. Cl.² .................................................. H01M 4/36
[52] U.S. Cl. ................................ 429/105; 429/198; 429/199; 429/222; 429/229
[58] Field of Search ............... 429/105, 101, 198–201, 429/229–231, 222

[56] References Cited

U.S. PATENT DOCUMENTS

| | | | |
|---|---|---|---|
| 2,566,114 | 8/1951 | Bloch | 429/199 |
| 3,660,170 | 5/1972 | Rampel | 429/198 |
| 3,738,870 | 6/1973 | DeRossi | 429/198 |
| 3,811,945 | 5/1974 | DeRossi | 429/105 |
| 3,816,177 | 6/1974 | Walsh | 429/201 X |
| 3,944,430 | 3/1976 | Lee | 429/201 |
| 3,945,849 | 3/1976 | Hoffman | 429/201 |

*Primary Examiner*—Charles F. LeFevour
*Attorney, Agent, or Firm*—Joseph J. Dvorak

[57] ABSTRACT

An improved aqueous metal-halogen electrochemical cell, particularly a zinc bromide cell, contains a water soluble tetraorgano-substituted ammonium salt in the electrolyte which forms a substantially water insoluble liquid complex with cathodic halogen thereby reducing self-discharge of the cell. Particularly preferred as the ammonium salt is N-ethyl, N-methyl morpholinium bromide.

20 Claims, 1 Drawing Figure

U.S. Patent  Jan. 10, 1978  4,068,046
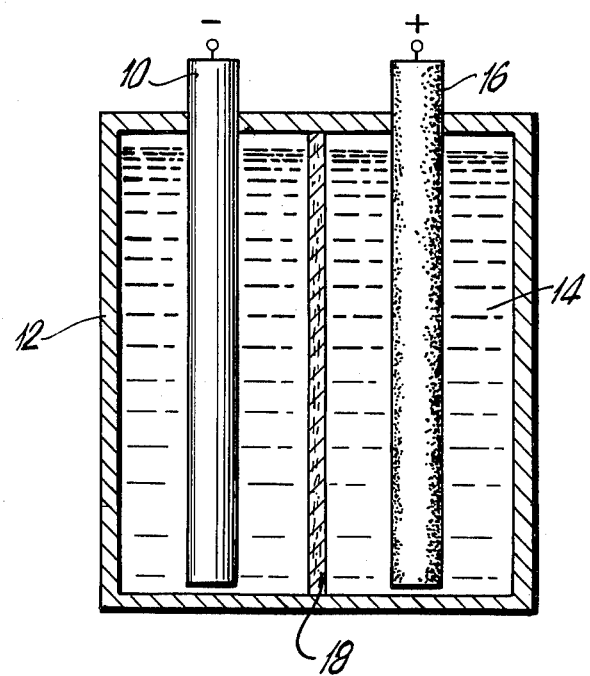

METAL HALOGEN ELECTROCHEMICAL CELL

REFERENCE TO RELATED APPLICATION

This application is a continuation-in-part of our earlier application Ser. No. 674,585, filed Apr. 7, 1976, now abandoned.

BACKGROUND OF THE INVENTION

1. Field of the Invention

This invention relates to metal halogen cells having an aqueous solution of a metal halide as the electrolyte. In particular, the present invention relates to improved cells and batteries employing a zinc or cadmium anode, a bromide cathode and an aqueous metal bromide electrolyte in which the metal is the same as the metal of the anode.

2. The Prior Art

Cells for the production of electricity having two electrodes, one with a high positive oxidizing potential, the anode, and one with a strong negative or reducing potential, the cathode, have long been known. Typical of such type cells are metal halogen cells in which the anode material most commonly employed is zinc and the most commonly employed cathodic halogen is bromine. Among the advantages of such cells is their extremely high theoretical energy density. For example, in the zinc-bromine cell, the battery will have a theoretical energy density of 200 W·h/lb. (i.e., watt hours per pound) and an electric potential of about 1.85 volts per cell.

In such a cell the surface of the anode, for example zinc, oxidizes, i.e., undergoes a positive increase in valence. As a result thereof, zinc atoms are converted to zinc ions which enter the electrolyte according to the equation:

$$Zn \rightarrow Zn^{++} + 2e$$

The chemical reaction occurring at the cathode is expressed by the following equation:

$$Br_2 + 2e \rightarrow 2Br^-$$

Thus, the overall chemical reaction can be written as follows:

$$Zn + Br_2 \rightleftharpoons Zn^{++} + 2Br^-$$

The arrow to the right indicates the direction of the chemical reaction occurring during cell discharge and the arrow to the left indicates the chemical reaction occurring during charging of the cell.

The electrochemical cells of the foregoing type are known to suffer from a number of disadvantages. Most of these disadvantages are associated with side reactions which may occur in such cells. For example, during the charging process free bromine is produced in the cell. This free bromine is available for chemical reaction with the metal anode, e.g., zinc, thereby resulting in an autodischarge of the cell. Additionally, there is the tendency for hydrogen gas to be generated when considerable amounts of free bromine are present in the aqueous phase. It is believed that hydrogen is generated according to the following chemical reactions:

$$Br_2 + H_2O \rightarrow HBr + HBrO$$

$$2HBr + Zn \rightarrow ZnBr_2 + H_2$$

The art is replete with efforts on the part of many inventors to overcome the above-mentioned disadvantages. U.S. Pat. No. 2,566,114, for example, discloses the use of tetraethyl and tetramethyl ammonium bromides for binding bromine generated during charging of the cell. The tetraalkyl ammonium bromide is added to the powdered carbon surrounding the cathode.

U.S. Pat. No. 3,738,870 discloses the use of the solid mixture of an alkyl ammonium perchlorate and conductive materials such as graphite to form solid addition products with halogen released during charging of such cells.

U.S. Pat. No. 3,811,945 discloses the use of certain alkyl ammonium perchlorates, diamine bromides and diamine perchlorates, which are capable of forming solid addition products with cathodic bromine and which are substantially insoluble in water.

In contrast to those references which suggest forming solid addition products with bromine, U.S. Pat. No. 3,408,232 discloses the use of an organic solvent for elemental bromine in such aqueous zinc-bromine batteries.

U.S. Pat. No. 3,816,177 discloses the use of a quaternary ammonium halide and a depolarizer in the electrolyte. The depolarizer is an organic complexing solvent which dissolves in water and is nonreactive towards the halogen in the cell and forms a water insoluble complex in the presence of quaternary ammonium halides.

These references and many others show a continuing effort on the part of many inventors to overcome some of the disadvantages associated with the metal halogen cells of the type referred to herein. Unfortunately, the methods proposed for overcoming the aforementioned disadvantages have not adequately overcome such disadvantages. There is, consequently, a need for more effective methods for preventing loss of cell capacity in aqueous zinc-halogen cells.

SUMMARY OF THE INVENTION

The present invention is predicated on the discovery that molecular bromine is sufficiently separated from an aqueous solution in the form of a liquid complex by chemical reaction with certain tetraorgano-substituted ammonium salts, especially substituted ammonium bromides. Specifically the tetraorgano-substituted ammonium salt is one which is asymmetrical; it is soluble in water, and, indeed, it is soluble in aqueous zinc bromide solution; and it is capable of combining with molecular bromine to form a substantially water-immiscible liquid complex.

Accordingly, in one embodiment of the present invention there is provided an electrochemical cell comprising a metal anode selected from zinc and cadmium; a bromine cathode; an aqueous metal bromide solution as electrolyte, the metal of the metal bromide being the same as the metal of the anode; and a water soluble asymmetrical tetraorgano-substituted ammonium salt which combines with cathodic bromine to form a substantially water insoluble liquid complex whereby shelf life and cell capacity are improved.

In another embodiment of the present invention, there is provided an aqueous metal bromine secondary battery including a plurality of electrochemical cells, said cells comprising a metal anode, the metal being selected from zinc and cadmium; a nonreactive electrode; an aqueous electrolyte containing a metal bromide, the metal being the same as the metal of the anode; and, a tetraorgano substituted ammonium bromide which is soluble in water, which forms a substantially water insoluble liquid complex with bromine and which acts as a source of cathodic bromine during cell discharge.

These and other embodiments of the present invention will become more apparent upon a reading of the detailed description in conjunction with the drawing.

DESCRIPTION OF THE DRAWING

The sole FIGURE is a cross-sectional view of a cell in accordance with the present invention.

DETAILED DESCRIPTION OF THE INVENTION

Turning now to the FIGURE, there is shown one embodiment of the cell of the present invention. As illustrated in the FIGURE, an electrochemical cell of the present invention comprises a metal anode 10 disposed in a container 12 containing aqueous electrolyte 14.

The metal anode in accordance with the present invention is selected from zinc and cadmium. It should be noted, however, that it is not absolutely essential that the metal anode be formed solely of zinc or cadmium. Indeed, inert wire mesh or various forms of porous carbon materials upon which zinc or cadmium may be plated can serve very well in forming zinc or cadmium electrode.

Spaced apart from the anode 10 is a chemically inert electrode 16. Inert electrode 16 is disposed within container 12 so as to be in contact with aqueous electrolyte 14 and the bromine active cathodic material which material will be described hereinafter in greater detail. Turning first, however, to electrode 16 it should be noted that a wide range of inert materials can be used for fabricating electrode 16, such as various forms of electrically conductive and non-corrosive materials, including porous carbon, graphite and carbon felt. Indeed, the inert electrode 16 preferably is formed of a highly porous material which will absorb the bromine active material. A suitable chemically inert electrically conductive material for forming an inert electrode 16 for the practice of the present invention is carbon felt, such as UCAR grade VDF carbon felt sold by Union Carbide Corporation, Carbon Products Division, 270 Park Ave., New York, N.Y.

The electrolyte of the cell of the present invention is an aqueous metal bromide solution in which the metal of the bromide corresponds to the metal of the anode. Thus, when zinc is the anode active material the metal bromide used in the electrolyte is a zinc bromide. Similarly, with cadmium as the active metal anode material, the electrolyte is an aqueous cadmium bromide solution.

The concentration of metal bromide in the aqueous electrolyte is not critical and a wide range of concentrations may be employed depending, for example, on the desired energy density of the cell. Typically, the molarity of the aqueous metal bromide solution will be in the range of about 2.5 to 3.5 molar although the concentration can be as low as 0.5 molar and as high as 6.0 molar and higher.

Optionally, and preferably, other salts such as zinc sulfate may be added to the electrolyte to improve electrolyte conductivity and/or zinc plating characteristics. The effects of such additives are well known and form no part of the present invention.

As is shown in the FIGURE, the cell is provided with a separator 18 which prevents internal shorting that can typically occur as a result of dendrite growth. The separator 18 can be any porous material typically used to prevent physical contact of the two electrodes such as fiberglass mats, fiberglass felt, microporous polymeric materials such as porous polyethylene, and the like.

As is indicated hereinbefore, the cathode active material of the present invention is molecular bromine.

Additionally, the cathode active material is present as a substantially water-insoluble, liquid halogen complex of an asymmetrical (i.e. it does not have an axis of symmetry in the molecule) tetraorgano-substituted ammonium salt. The asymmetrical, tetraorgano-substituted ammonium salts suitable in the practice of the present invention are defined by the following characteristics. First, the tetraorgano-substituted ammonium salt must be soluble in aqueous electrolyte, especially 2.5 to 3.5 molar zinc bromide solution; and, second, it must be one which is capable of combining with the cathodic bromine. Third, the halogen complex must be a substantially water immiscible liquid over a temperature range of from about 10° C. to about 60° C. and at least between 13° C. to 30° C. The tetraorgano-substituted ammonium salts presently contemplated can be represented by the general structural formula:

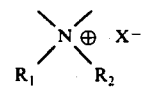

where the dangling valences of the nitrogen atom are connected to carbon atoms of saturated hydrocarbyl radicals forming a five-membered ring system including the nitrogen (thus the nitrogen atom is an endocyclic nitrogen atom), and a six-membered ring system including another heteroatom. Typically, the other heteroatom will be oxygen or sulfur. In the above formula, $R_1$ is an alkyl or haloalkyl radical of from 1 to 8 carbon atoms attached to the nitrogen atom by a carbon atom and $R_2$ is an alkyl or haloalkyl organic radical of from 1 to 8 carbon atoms attached to the nitrogen atom by a carbon atom. In the above formula, $R_2$ may be the same as $R_1$ when the saturated hydrocarbyl radical includes a lower alkyl or haloalkyl substituent from 1 to 4 carbon atoms; otherwise, $R_2$ is different from $R_1$. Tne anion of the salt, $X^-$, generally is a chloride or bromide anion and especially is a bromide.

As a further illustration of the compounds contemplated by the present invention are asymmetrical piperidinium, pyrrolidinium and morpholinium salts represented by the following formulas:

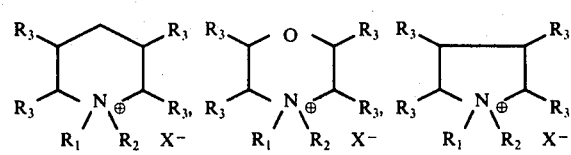

wherein $R_1$ is a methyl group and $R_2$ is selected from alkyl groups having from 1 to 8 carbon atoms, such as ethyl, propyl, isopropyl and the like and haloalkyl groups having from 1 to 8 carbon atoms such as chloromethyl and bromomethyl groups, and $R_3$ is independently at each occurrence selected from hydrogen and alkyl groups having from 1 to 4 carbon atoms; and when $R_3$ is hydrogen at each location, $R_2$ is different from $R_1$. The anion, $X^-$, in each of the foregoing is selected from bromide and chloride, and is preferably bromide.

Examples of compounds within the above-mentioned class of compounds are the following:

| Formula | Name |
|---|---|
| (pyrrolidinium with CH₃, C₂H₅, Br⁻) | N-ethyl, N-methylpyrrolidinium bromide |
| (pyrrolidinium with CH₃, CH₂Cl, Br⁻) | N-chloromethyl, N-methyl pyrrolidinium bromide |
| (3-methylpyrrolidinium with CH₃, CH₃, Br⁻) | N,N-dimethyl, 3-methyl pyrrolidinium bromide |
| (2-methylpyrrolidinium with CH₃, CH₃, Br⁻) | N,N-dimethyl, 2-methyl pyrrolidinium bromide |
| (2,4-dimethylpyrrolidinium with CH₃, CH₃, Br⁻) | N,N-dimethyl, 2,4-dimethyl pyrrolidinium bromide |
| (piperidinium with CH₃, C₂H₅, Br⁻) | N-ethyl, N-methylpiperidinium bromide |
| (3-methylpiperidinium with CH₃, CH₃, Br⁻) | N,N-dimethyl, 3-methyl piperidinium bromide |
| (morpholinium with CH₃, C₂H₅, Br⁻) | N-ethyl, N-methylmorpholinium bromide |
| (morpholinium with CH₃, CH₂Cl, Br⁻) | N-chloromethyl, N-methyl morpholinium bromide |
| (3-methylmorpholinium with CH₃, CH₃, Br⁻) | N,N-dimethyl, 3-methyl morpholinium bromide |
| (2-methylmorpholinium with CH₃, CH₃, Br⁻) | N,N-dimethyl, 2-methyl morpholinium bromide |
| (2,5-dimethylmorpholinium with CH₃, CH₃, Br⁻) | N,N-dimethyl, 2,5-dimethyl morpholinium bromide |

The tetraorgano-substituted ammonium salt used in the cell of the present invention is dissolved in the electrolyte solution 14 where it is available to complex the bromine upon charging of the cell. The amount of tetraorgano-substituted ammonium salt used, e.g., the bromide, will depend upon the amount of metal bromide present and the depth of charge among other things. Generally, however, the ratio of tetraorgano-substituted ammonium salt to metal bromide employed will be from about 1:4 to about 1:1. Typically, the ratio of tetraorgano-substituted ammonium salt to metal bromide used will be 1:3.

The above-mentioned tetraorgano-substituted ammonium salts are prepared by well known techniques. Typically, these compounds are prepared by reacting an appropriate tertiary amine with an appropriate alkyl halide. For example, N-ethyl, N-methyl morpholinium bromide can be prepared by reacting N-methylmorpholine with ethyl bromide in a suitable solvent. Similarly, N-ethyl, N-methyl pyrrolidinium bromide can be prepared by reacting N-methyl pyrrolidine with ethyl bromide in a suitable solvent. The corresponding piperidinium compounds too are prepared by the same general technique.

The tertiary amines and the alkyl halides are generally commercially available; however, preparative methods also are found in the chemical literature.

As will be appreciated, when the cell is charged bromine is produced at the surface of the inert cathode 16 where it will complex with the halogen complexing ammonium salt present in the electrolyte to form a liquid immiscible bromine complex. Thus, with a zinc bromide electrolyte, bromine is generated at electrode 16 during charging of the cell. The bromine so generated is complexed by the ammonium salt while the zinc is deposited on electrode 10.

In the cell shown in the figure, it should be noted that the inert electrode 16 is a porous material which is capable of storing the liquid bromine complex within the pores of the electrode structure.

It will be appreciated that one of the advantages in the use of asymmetrical (i.e., not having an axis of symmetry in the molecule) tetraogano-substituted ammonium salts in accordance with the present invention is that the bromine complex which results from the combination of the cathodic bromine and the salt is a liquid at least at cell operating temperatures and it is fluid. It does not require additional volumes of material such as aprotic solvents or organic materials to keep the complex in a liquid form, thereby increasing the volume of the liquid that must be handled in order to complex the bromine.

The following examples illustrate modes of practicing the present invention.

EXAMPLE 1

A zinc-bromine secondary cell was constructed in which one electrode was formed from carbon powder and a plastic binder. The carbon and plastic binder was compressed on a tantalum screen current collector and used as an anode substrate for zinc deposition. A commercially available carbon felt material was impressed on a tantalum screen and used as an inert counterelectrode. Both electrodes had an area of 20 cm². Two layers of glass fiber filter paper was used as the battery separator. The assembly was then filled with an aqueous electrolyte containing 3 molar zinc bromide, 0.2 molar zinc sulfate and 1 molar N-ethyl, N-methyl morpholinium bromide. The theoretical capacity of the cell was 0.88 A·h (amp-hrs.), based on zinc bromide.

The cell so constructed was cycled under a 0.19 amp charge and a 0.38 amp discharge regime, corresponding to current densities of 10 mA·cm⁻² during charging and 20 mA·cm⁻² during discharging. As is shown in Table I, the coulombic efficiencies are greater than or equal to 75% at the high material utilization in cycles 3 and 4.

TABLE I

| Cycle | $I^c$,A | $Q^c$,A·h | $I^d$,A discharge | $Q^d$,A·h discharge | E,% |
|---|---|---|---|---|---|
| 1 | 0.19 | 0.11 | 0.38 | 0.08 | 73 |
| 2 | 0.19 | 0.16 | 0.38 | 0.14 | 88 |
| 3 | 0.19 | 0.87 | 0.38 | 0.65 | 75 |
| 4 | 0.19 | 0.79 | 0.38 | 0.62 | 78 |

(a) $I^c$ is the current in the charging mode.
(b) $Q^c$ is coulombs in the charging mode.
(c) $I^d$ is the current in the discharging mode.
(d) $Q^d$ is coulombs in the discharging mode.
(e) E is the efficiency.

EXAMPLE 2

In this example, the anode substrate employed for zinc deposition consisted of carbon powder in a plastic binder impressed on a tantalum screen. The inert counter-electrode consisted of a mixture of charcoal and carbon black in a tetrafluoro ethylene binder and impressed on a tantalum screen. A commercially available silica filled porous polyethylene sheet material was used as the battery separator. As in Example 1, the area of each electrode was 20 cm². The cell was filled with 7.0 cm³ of an aqueous electrolyte containing 3 molar ZnBr₂; 1 molar N-ethyl, N-methyl morpholinium bromide; and 0.2 molar ZnSO₄. The theoretical capacity of the cell was 1.12 A·h. The cell was put through a charging-discharging regime as shown in Table II below.

TABLE II

| Cycle | $I^c$,A | $Q^c$,A·h | %U | $I^d$,A | $Q^d$,A·h | E,% |
|---|---|---|---|---|---|---|
| 3 | 0.20 | 0.84 | 75 | 0.1 | 0.57 | 68 |
| 4 | 0.20 | 0.93 | 83 | 0.1 | 0.60 | 64 |
| 5 | 0.20 | 0.90 | 80 | 0.4 | 0.47 | 52 |
| 8 | 0.20 | 0.82 | 73 | 0.1 | 0.43 | 52 |

N.B. For an explanation of column headings, see Table I.

EXAMPLE 3

Following the procedure of Example 2, a cell was charged with 6.0 cm³ of an aqueous electrolyte containing 3.0M ZnBr₂ and 1.0M N-ethyl, N-methyl pyrrolidinium bromide. The theoretical capacity of the cell was 0.96 A·h. The cell was put through a charging-discharging regime as shown in Table III below in which the various column headings are the same as those used in the prior examples.

TABLE III

| Cycle | $I^c$,A | $Q^c$,A·h | %U | $I^d$,A | $Q^d$,A·h | E,% |
|---|---|---|---|---|---|---|
| 1 | 0.21 | 0.74 | 77 | 0.21 | 0.60 | 81 |
| 2 | 0.21 | 0.69 | 72 | 0.21 | 0.58 | 83 |
| 3 | 0.21 | 0.68 | 71 | 0.21 | 0.56 | 82 |
| 4 | 0.21 | 0.72 | 75 | 0.21 | 0.57 | 80 |
| 5 | 0.21 | 0.79 | 82 | 0.21 | 0.66 | 83 |

N.B. For an explanation of the column headings see Table I.

EXAMPLE 4

Following the procedure of Example 2, a cell was charged with 6.0 cm³ of an aqueous electrolyte containing 2.5M ZnBr₂ and 0.85M N-chloromethyl, N-methyl-morpholinium bromide. The cell was put through a charging-discharging regime as shown in Table IV.

TABLE IV

| Cycle | $I^c$, A | $Q^c$, A·h | %U | $I^d$, A | $Q^d$, A·h | E,% |
|---|---|---|---|---|---|---|
| 1 | 0.20 | 0.72 | 84 | 0.40 | 0.50 | 70 |
| 2 | 0.20 | 0.66 | 77 | 0.20 | 0.49 | 74 |
| 3 | 0.20 | 0.70 | 82 | 0.20 | 0.50 | 71 |
| 4 | 0.20 | 0.66 | 77 | 0.20 | 0.47 | 72 |
| 5 | 0.20 | 0.63 | 74 | 0.20 | 0.47 | 74 |

N.B. For an explanation of the column headings, see Table I.

EXAMPLE 5

Following the procedure of Example 2, a cell was charged with 6.3 cm³ of an aqueous electrolyte containing 3.0M ZnBr₂ and 1.0M N-chloromethyl, N-methyl-pyrrolidinium bromide. The cell was put through a charging and discharging regime as shown in Table V.

TABLE V

| Cycle | $I^c$, A | $Q^c$, A·h | %U | $I^d$,A | $Q^d$, A·h | E,% |
|---|---|---|---|---|---|---|
| 1 | 0.22 | 0.96 | 91 | 0.21 | 0.72 | 75 |
| 2 | 0.22 | 0.97 | 92 | 0.21 | 0.74 | 76 |
| 3 | 0.22 | 0.99 | 94 | 0.23 | 0.77 | 77 |
| 4 | 0.22 | 0.94 | 89 | 0.22 | 0.69 | 73 |
| 5 | 0.22 | 0.91 | 86 | 0.23 | 0.66 | 73 |

N.B. For an explanation of column headings, see Table I.

EXAMPLE 6

A comparative test was conducted using the cell of Example 2. In this test, however, 6.0 cm³ of aqueous electrolyte was employed and the electrolyte did not contain any halogen complexing ammonium salt. The electrolyte merely contained 3 molar ZnBr₂ and 0.2 molar ZnSO₄. The theoretical capacity of this cell was 0.96 A·h. The cycling regime and the results thereof are given in Table VI below.

TABLE VI

| Cycle | $I^c$,A | $Q^c$,A·h | %U | $I^d$,A | $Q^d$,A·h | E,% |
|---|---|---|---|---|---|---|
| 2 | 0.2 | 0.77 | 80 | 0.4 | 0.31 | 41 |
| 4 | 0.2 | 0.64 | 67 | 0.4 | 0.20 | 31 |
| 5* | 0.2 | 0.45 | 47 | 0.1 | 0.0 | 0 |
| 6 | 0.2 | 0.86 | 90 | 0.1 | 0.26 | 30 |
| 8 | 0.2 | 0.86 | 90 | 0.1 | 0.30 | 35 |

(5*) The cell was allowed to stand at open circuit potential between charge and discharge for 15 hours.
N.B. For an explanation of column headings, see Table I.

As can be seen in this example, the cell is less efficient than the cell of this invention and is also subject to self discharge.

What is claimed is:

1. In an electrochemical cell having a metal anode selected from the group consisting of zinc and cadmium; a bromine cathode; and, an aqueous electrolyte containing a metal bromide, the metal bromide having the same metal as the metal of the anode, the improvement comprising: a bromine complexing agent in said aqueous metal bromide electrolyte consisting solely of a tetraorgano substituted ammonium salt, which salt is soluble in water and forms a substantially water immiscible liquid bromine complex at temperatures in the range of about 10° C to about 60° C and wherein the tetraorgano substituted ammonium salt is selected from asymmetric quaternary ammonium compounds having the formula:

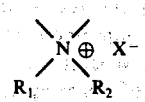

wherein the dangling valences of nitrogen indicates that the nitrogen is an endocyclic nitrogen atom connected to carbon atoms, thereby forming a ring structure selected from saturated five-membered ring structure and a saturated six-membered ring structure including an additional heteroatom and wherein X⁻ is a halide selected from chloride and bromide, and R₁ and R₂ are selected from alkyl groups and haloalkyl groups of from 1 to 8 carbon atoms.

2. The cell of claim 1 wherein the anode metal is zinc.

3. The cell of claim 1 wherein the anode metal is cadmium.

4. The cell of claim 1 wherein the halide, X⁻, is bromide.

5. The cell of claim 1 wherein the asymmetrical quaternary ammonium compound is selected from piperidinium, pyrrolidinium and morpholinium salts represented by the formulas:

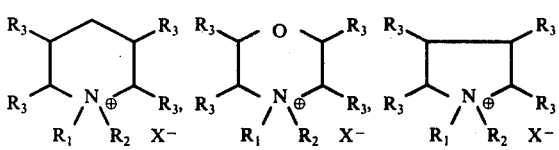

wherein R₁ is a methyl group and R₂ is selected from alkyl groups and haloalkyl groups having from 1 to 8 carbon atoms, R₃ is independently at each occurrence selected from hydrogen and alkyl groups having from 1 to 4 carbon atoms, and when R₃ is hydrogen at each location R₂ is different from R₁; and, X⁻ is a halide selected from chloride and bromide.

6. The cell of claim 5 wherein the quaternary ammonium compound is a morpholinium salt having the formula:

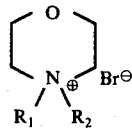

wherein R₁ is a methyl group and wherein R₂ is selected from the group consisting of alkyl groups having from 2 to 8 carbon atoms and chloromethyl group.

7. The cell of claim 5 wherein the quaternary ammonium compound is a pyrrolidinium bromide.

8. The cell of claim 5 wherein the quaternary ammonium compound is a piperidinium bromide.

9. The cell of claim 6 wherein the quaternary ammonium compound is N-ethyl, N-methyl morpholinium bromide.

10. The cell of claim 6 wherein the quaternary ammonium compound is N-chloromethyl, N-methyl morpholinium bromide.

11. The cell of claim 7 wherein the pyrrolidinium bromide is N-ethyl, N-methyl pyrrolidinium bromide.

12. The cell of claim 7 wherein the pyrrolidinium bromide is N-chloromethyl, N-methyl pyrrolidinium bromide.

13. The cell of claim 8 wherein the piperidinium bromide is N-ethyl, N-methyl piperidinium bromide.

14. An aqueous metal halogen secondary battery including a plurality of electrochemical cells, said electrochemical cells comprising a metal anode selected from the group consisting of zinc and cadmium; an inert counterelectrode; and aqueous electrolyte, said aqueous electrolyte consisting essentially of an aqueous metal bromide solution in which the metal is the same as the metal of the anode and a cathodically active bromine complex which complex is a liquid at temperatures in the range of about 10° C to about 60° C and substantially water immiscible, said bromine complex being formed solely between bromine and a water soluble, asymmetric quaternary ammonium bromide having the general formula:

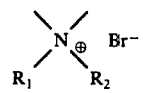

wherein the dangling valences of the nitrogen indicate that the nitrogen is part of an endocyclic structure selected from five-membered structures and six-membered structures containing only carbon and hydrogen and another heteroatom and wherein R₁ is selected from alkyl groups having from 1 to 8 carbon atoms and R₂ is selected from alkyl groups and haloalkyl substituted groups having from 1 to 8 carbon atoms but different from R₁.

15. The battery of claim 14 wherein the metal anode is zinc.

16. The battery of claim 15 wherein the aqueous electrolyte is a solution of zinc bromide.

17. The battery of claim 16 wherein the quaternary ammonium compound is an asymmetric morpholinium compound having the general formula:

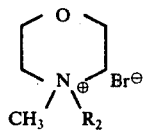

wherein R₂ is an alkyl radical having from 2 to 8 carbon atoms or chloromethyl groups.

18. The battery of claim 16 wherein the quaternary ammonium compound is an asymmetric pyrrolidinium compound having the general formula:

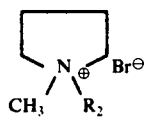

wherein $R_2$ is an alkyl radical having from 2 to 8 carbon atoms or chloromethyl groups.

19. The battery of claim 16 wherein the quaternary ammonium compound is an asymmetric piperidinium compound having the formula:

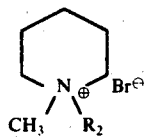

wherein $R_2$ is an alkyl radical having from 2 to 8 carbon atoms or a chloromethyl group.

20. An aqueous zinc bromide cell comprising a zinc anode; an inert electrode; and, an aqueous zinc bromine electrolyte containing a cathodically active bromine complex consisting solely of bromine and a water soluble asymmetric quaternary ammonium bromide having the general formula:

wherein the dangling valences of nitrogen indicate that the nitrogen is an endocyclic nitrogen atom connected to carbon atoms, thereby forming a ring structure selected from saturated five-membered ring structures and a saturated six-membered ring structure including an additonal heteroatom and wherein $R_1$ and $R_2$ are selected from alkyl groups and haloalkyl groups of from 1 to 8 carbon atoms, said quaternary ammonium bromide being capable of forming a substantially water immiscible complex with bromine which complex is a liquid at temperatures ranging from about 10° to about 60° C.

* * * * *